United States Patent
Lan et al.

(10) Patent No.: US 9,392,179 B2
(45) Date of Patent: Jul. 12, 2016

(54) MAGNIFYING ELEMENT WITH CAMERA MODULE AND ELECTRONIC DEVICE HAVING MAGNIFYING ELEMENT

(71) Applicant: HON HAI PRECISION INDUSTRY CO., LTD., New Taipei (TW)

(72) Inventors: Wei-Ming Lan, New Taipei (TW); Tsung-Heng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/531,292

(22) Filed: Nov. 3, 2014

(65) Prior Publication Data
US 2016/0037078 A1 Feb. 4, 2016

(30) Foreign Application Priority Data
Jul. 29, 2014 (TW) .............................. 103125840 A

(51) Int. Cl.
*H04N 5/222* (2006.01)
*H04N 5/232* (2006.01)
*H04N 5/225* (2006.01)

(52) U.S. Cl.
CPC ......... *H04N 5/23296* (2013.01); *H04N 5/2253* (2013.01); *H04N 5/2254* (2013.01)

(58) Field of Classification Search
CPC H04N 5/23296; H04N 5/2253; H04N 5/2254
See application file for complete search history.

(56) References Cited

U.S. PATENT DOCUMENTS

| 6,424,465 | B2 * | 7/2002 | Suzuki | 359/554 |
|---|---|---|---|---|
| 6,449,100 | B2 * | 9/2002 | Nakazawa | G02B 15/12 359/672 |
| 7,397,501 | B2 * | 7/2008 | Afsenius | G06T 5/50 348/208.13 |
| 8,873,154 | B2 * | 10/2014 | Takemoto | G02B 15/12 359/672 |
| 2001/0033426 | A1 * | 10/2001 | Nakazawa | G02B 15/12 359/673 |
| 2005/0068454 | A1 * | 3/2005 | Afsenius | G06T 5/50 348/345 |
| 2005/0259328 | A1 * | 11/2005 | Miyazawa | G02B 15/10 359/673 |
| 2013/0208173 | A1 * | 8/2013 | Takemoto | G02B 15/12 348/340 |
| 2015/0226942 | A1 * | 8/2015 | Suzuki | G02B 9/38 359/673 |

* cited by examiner

*Primary Examiner* — Nicholas Giles
(74) *Attorney, Agent, or Firm* — ScienBiziP, P.C.

(57) ABSTRACT

An electronic device includes a magnifying element. The magnifying element includes a camera module and a lens module. The camera module includes an image sensor and a lens related to the image sensor. The lens module is mounted on the lens and used as back projection to ensure that the light exit aperture of the lens module is opposite to the entrance aperture of the camera module. The power of magnification of the electronic device with a magnifying element is determined by the design features of the lens module.

14 Claims, 1 Drawing Sheet

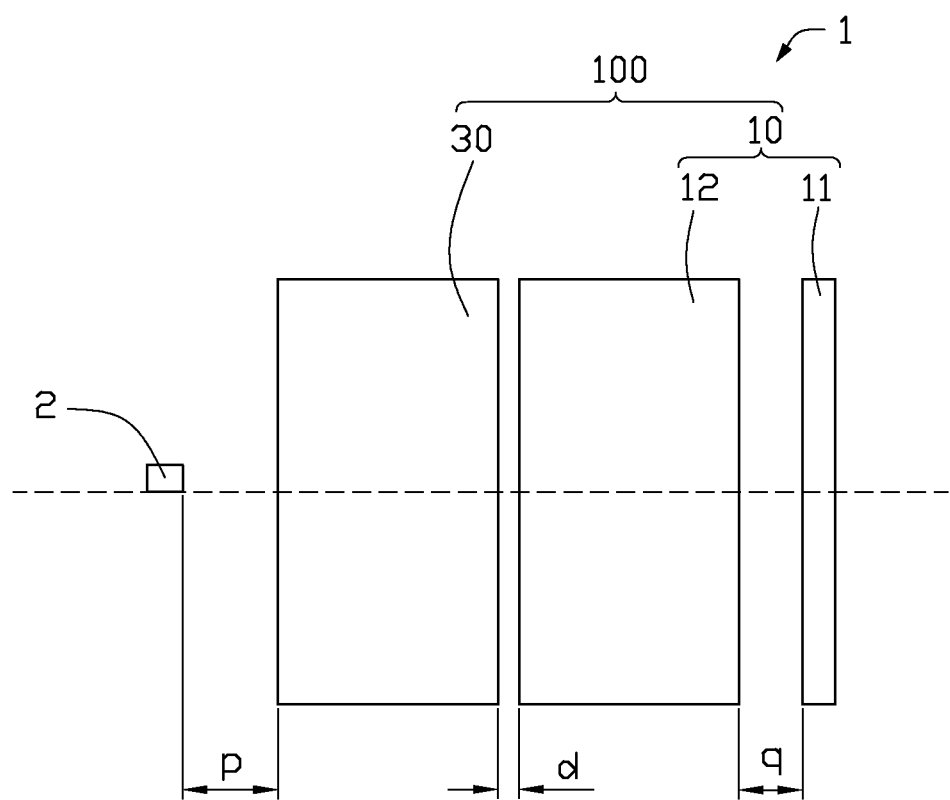

MAGNIFYING ELEMENT WITH CAMERA MODULE AND ELECTRONIC DEVICE HAVING MAGNIFYING ELEMENT

FIELD

The present disclosure relates to imaging and image capture.

BACKGROUND

Electronic devices can be designed with a camera function. The camera module in the electronic device with a constant focal length generally sets up an image sensor on the focal plane of the lens to facilitate imaging of distant objects. The height of the image obtained from the lens is small, and the image quality drops after directly magnifying the image to be shown on a display. In addition, it is difficult for the camera module to take a clear image as the distance to the object s small.

BRIEF DESCRIPTION OF THE DRAWING

Many aspects of the disclosure can be better understood with reference to the following drawing. The components in the drawing are not necessarily drawn to scale, the emphasis instead being placed upon clearly illustrating the principles of the disclosure. Implementations of the present technology will now be described, by way of example only, with reference to the attached figure.

FIG. 1 is a diagrammatic view of an electronic device with a magnifying element, according to the present disclosure.

DETAILED DESCRIPTION

An electronic device with magnifying elements is described. The disclosure is illustrated by way of example and not by way of limitation in the accompanying drawing. It should be noted that references to "an" or "one" embodiment in this disclosure are not necessarily to the same embodiment, and such references mean "at least one."

An electronic device includes a magnifying element. The electronic device can be a mobile device or a mobile phone. The magnifying element includes a camera module and a lens module. The camera module includes an image sensor and a lens related to the image sensor. The object side of the lens module is mounted on the lens for back projection to ensure that the light transmission aperture of the lens module is opposite to the light entrance aperture of the camera module. The magnifying element can magnify an appearance of an object positioned in front of the lens module and the magnification power of the electronic device with a magnifying element is larger than that of an electronic device with the camera module only. The magnification power of the electronic device with a magnifying element is determined by the design features of the lens module.

The electronic device with a magnifying element can obtain a clear image even when the object distance is less than 10 millimeters (10 mm), and the magnification power can be greater than 25.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

FIG. 1 shows a diagrammatic view of an electronic device for imaging. The image system includes an electronic device 1 and an object 2. The electronic device can be a mobile phone. The electronic device 1 includes a magnifying element 100. The magnifying element 100 of the electronic device 1 includes a camera module 10 and a lens module 30. The camera module 10 includes an image sensor 11 and a lens 12 which is related to the image sensor 11. The lens 12 can be a single lens, a multiple lenses, or a lens module. The image sensor 11 can be 1.8 mm long, and the focal length of the lens 12 can be 3 mm. The object 2 is disposed in front of the camera module 10 and can have a height of 1 mm. The object side of the lens module 30 is mounted on the lens 12 and is used as a back (reverse) projection so that the lens module 30 is directly opposite the lens 12 to ensure that the exit aperture of the lens module 30 is opposite to the entrance aperture of the camera module 10, to form a magnifying element 100 for magnifying the object image. The exit aperture (not shown) is the last common optical exit aperture through which the light emitted from each point of the object plane can be joined as a light beam to pass through the aperture to exit from the lens module 30. The entrance aperture (not shown) is the common optical entrance aperture through which the light beam from the lens module will pass to enter into the camera module 10. The back (reverse) projection uses the lens module as a reverse ray trace at the boundary, where the original entrance aperture changes to become the exit aperture. When the lens 12 is a lens module, it can be the same as the lens module 30. Both of the lens modules are arranged to be face to face. The lens module 30 is a back projection device and the lens 12 is a forward projection device. Where the focal length of the lens 12 is 3 mm and the distance d between the lens module 30 and the lens 12 of the camera module 10 is 1 mm, an equivalent focal length (EFL) of the magnifying element 100 can be calculated as 1.8 mm by using the formula (1) for the equivalent focal length. The formula (1) is described as $$EFL=(f1*f2)/(f1+f2-d) \quad (1)$$

where f1 and f2 are the focal lengths of the lens module 30 and the lens 12, d is the spacing between the lens module and the lens of the camera module 10. If the distance between the image sensor 11 and the lens 12 is 3 mm, that is, the image distance q is 3 mm, the object distance p of the object 2 can be calculated as 4.5 mm from the imaging formula (2) as the focal length is the equivalent focal length of 1.8 mm. The image formula (2) is described as $$1/p+1/q=1/f \quad (2)$$

where p and p are the object distance and the image distance, f is the focal length.

in the present embodiment, the object has a height of 1 mm and the image of the object 2 in the image sensor 11 of the magnifying element 100 has a height of about 0.67 mm. For example, the image of an object 2 displayed on a cell phone screen (not shown) can have a height of 37.2% of the length of the cell phone screen, which corresponds to 33.48 mm where the actual length of the cell phone screen is 90 mm. It means that the image of the object displayed on such a cell phone screen is magnified 33.5 times compared to the object as seen by the naked eye.

The present embodiment is a mobile phone for example, but is not limited to the present embodiment, the image magnifying element of the present invention can also be used in other fields, for example, can be independently combined with a display panel as an electronic device for defects examinations.

The embodiments shown and described above are only examples. Many details are often found in the art such as the other features of an electronic device with a microscopic magnifying element. Therefore, many such details are neither shown nor described. Even though numerous characteristics and advantages of the present technology have been set forth in the foregoing description, together with details of the structure and function of the present disclosure, the disclosure is illustrative only, and changes can be made in the details, especially in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A magnifying element, comprising:
   a camera module, comprising an image sensor and a lens related to the image sensor; and,
   a lens module, which object side is mounted on the lens and is used as a back projection to ensure that an exit aperture of the lens module is opposite to an entrance aperture of the camera module.

2. The magnifying element according to claim 1, wherein the magnifying element can obtain a clear image as an object distance is equal to or less than 10 mm.

3. The magnifying element according to claim 1, wherein magnifying element has an effective focal length smaller than a focal length of the camera module.

4. The magnifying element according to claim 1, wherein the lens of the camera module is another lens module.

5. The magnifying element according to claim 1, wherein the lens has a focal length substantially same as a focal length of the lens module.

6. An electronic device, comprising:
   a magnifying element, comprising:
      a camera module, which comprises an image sensor and a lens related to the image sensor; and
      a lens module, which object side is mounted on the lens and is used as a back projection to ensure that an exit aperture of the lens module is opposite to an entrance aperture of the camera module.

7. The electronic device according to claim 6, wherein the magnifying element can obtain a clear image as an object distance is equal to or less than 10 mm.

8. The electronic device according to claim 6, wherein the magnifying element has an effective focal length smaller than a focal length of the camera module.

9. The electronic device according to claim 6, wherein the lens of the camera module is another lens module.

10. The electronic device according to claim 6, wherein the lens has a focal length substantially same as a focal length of the lens module.

11. The magnifying element according to claim 1, wherein the lens module is a back projection device, and the lens is a forward projection device.

12. The magnifying element according to claim 1, wherein the lens module and the lens are arranged to be face to face directly.

13. The electronic device according to claim 6, wherein the lens module is a back projection device, and the lens is a forward projection device.

14. The electronic device according to claim 6, wherein the lens module and the lens are arranged to be face to face directly.

* * * * *